United States Patent
Kim et al.

(10) Patent No.: US 9,832,426 B2
(45) Date of Patent: Nov. 28, 2017

(54) AROUND VIEW MONITOR SYSTEM AND MONITORING METHOD

(71) Applicant: Hyundai Mobis Co., Ltd., Yongin-si (KR)

(72) Inventors: Sang Jun Kim, Seongnam-si (KR); Mu Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 421 days.

(21) Appl. No.: 13/862,970

(22) Filed: Apr. 15, 2013

(65) Prior Publication Data
US 2014/0036063 A1    Feb. 6, 2014

(30) Foreign Application Priority Data

Aug. 6, 2012    (KR) .................. 10-2012-0085845

(51) Int. Cl.
*H04N 7/00* (2011.01)
*H04N 7/18* (2006.01)
*B60R 1/00* (2006.01)
*G07C 5/08* (2006.01)

(52) U.S. Cl.
CPC .............. *H04N 7/18* (2013.01); *B60R 1/00* (2013.01); *G07C 5/0866* (2013.01); *B60R 2300/105* (2013.01); *B60R 2300/607* (2013.01); *B60R 2300/70* (2013.01)

(58) Field of Classification Search
CPC .............. B60R 1/00; B60R 2300/607; B60R 2300/105; B60R 2300/70; B60R 2300/305; B60R 2300/802; B60R 2300/8093; B60R 2300/303; B60R 2300/8026; B60R 2300/806; B60R 11/04; B60R 2001/1253; B60R 2300/302; B60R 2300/306; B60R 2300/20; H04N 7/181
See application file for complete search history.

(56) References Cited

U.S. PATENT DOCUMENTS 7,161,616 B1    1/2007 Okamoto et al.
2011/0025848 A1*    2/2011 Yumiba et al. ................ 348/148

FOREIGN PATENT DOCUMENTS

| JP | 2008-213744 | 9/2008 |
| JP | 2011-151489 | 8/2011 |
| KR | 10-2010-0021046 A | 2/2010 |
| KR | 10-0956011 | 5/2010 |
| WO | WO 2011/001794 A1 | 1/2011 |

OTHER PUBLICATIONS

German Office Action dated Apr. 7, 2016 in counterpart German Application No. 102013206714.3 (5 pages, in German).

* cited by examiner

*Primary Examiner* — Frederick Bailey
*Assistant Examiner* — Farhan Mahmud
(74) *Attorney, Agent, or Firm* — NSIP Law

(57) ABSTRACT

The present disclosure relates to an around view monitor (AVM) system that provides image information on the ambient conditions of a vehicle to a driver. In displaying a top-view image in which the front, rear, left, and right conditions of a vehicle are seen downward from a portion over the vehicle, an AVM system and method checks a driving state or driving direction of the vehicle on the basis of information received from sensors and elements included in the vehicle, and outputs the top-view image which is suitably edited depending on the driving conditions, thereby providing information necessary for driving to a driver.

2 Claims, 8 Drawing Sheets

IMAGE CAPTURED BY
FOUR CAMERAS

IMAGE SHOWN BY
RELATED ART AVM SYSTEM,
IN STOP STATE

FORWARD LEFT TURN | FORWARD | FORWARD RIGHT TURN

REVERSE LEFT TURN | REVERSE | REVERSE RIGHT TURN (a) FORWARD (b) STOP (c) REVERSE (a)

VEHICLE SPEED: $\alpha + 2\delta$
GEAR STATE: DRIVING(D STEP)

(b)

VEHICLE SPEED: $\alpha + \delta$
GEAR STATE: DRIVING(D STEP)

(c)

VEHICLE SPEED: $\xi + \varepsilon$
GEAR STATE: REVERSE(R STEP)

(d)

VEHICLE SPEED: $\xi + 2\varepsilon$
GEAR STATE: REVERSE(R STEP)

FORWARD LEFT TURN

FORWARD

FORWARD RIGHT TURN

REVERSE LEFT TURN

REVERSE

REVERSE RIGHT TURN

AROUND VIEW MONITOR SYSTEM AND MONITORING METHOD

CROSS-REFERENCE TO RELATED APPLICATIONS

This application claims priority under 35 U.S.C. §119 to Korean Patent Application No. 10-2012-0085845, filed on Aug. 6, 2012, the disclosure of which is incorporated herein by reference in its entirety.

TECHNICAL FIELD

The present disclosure relates to an around view monitor (AVM) system that shows a captured image around a vehicle to a driver inside the vehicle and thus provides convenience in driving, and in particular, to an AVM system and method that differently edit and output images shown to a driver depending on the driving state of a vehicle, and thus provide image information, which is suitable for a driving condition, to a driver.

BACKGROUND

An AVM system is a system in which a monitor inside a vehicle displays an image (which is captured by a camera attached to the vehicle) around the vehicle, and thus enables a driver to perceive conditions around the vehicle with the displayed image and drive the vehicle.

In the AVM system, a screen is generally segmented into two regions (left and right regions). The left region displays an image captured by a front camera of a driving vehicle, and the right region displays a top view shown from on the vehicle, thereby enabling a driver to perceive the left, right, and rear conditions of the vehicle.

In displaying the above-described top view, a related art AVM system displays images, respectively captured by the front, rear, left, and right cameras of a vehicle, at the same ratio irrespective of the driving state or driving direction of the vehicle. In this case, the displayed images are illustrated in FIGS. 1 and 2 in detail.

FIGS. 1 and 2 illustrate ambient environment images captured by respective cameras and top-view images shown to a driver, in a related art AVM system.

FIG. 1 illustrates an ambient region (left drawing) of a vehicle which is visible with respective wide-angle lenses of front, rear, left, and right cameras attached to the vehicle, and illustrates an image (right drawing), which is shown by the related art AVM system, among images captured by respective cameras.

The related art AVM system appropriately edits a wide-region image (left drawing of FIG. 1) which is inputted through respective wide-angle lenses mounted on four cameras, and corrects the distortion of each of the wide-angle lenses, thereby generating a top-view image. In this case, the top-view image is displayed to be matched with the resolution of a monitor, and thus, among a plurality of images inputted through respective wide-angle lenses, only an image necessary for a vehicle is displayed, and the other images are discarded (see left drawing of FIG. 1).

FIG. 2 illustrates a top-view image which is shown to a driver depending on a driving state of a driving vehicle, in the related art AVM system. The related art AVM system does not consider a driving state or driving direction of a vehicle when outputting a top-view image, and thus displays the same image regardless of whether a driving state is a forward state or a reverse state and a driving direction is left or right.

FIG. 3 is a block diagram illustrating a related art AVM system 320. The related art AVM system 320 receives image data on an ambient environment captured by a camera 300, and receives gear information of a vehicle from a transmission 310 of the vehicle.

However, in outputting a top view, the related art AVM system 320 outputs a certain image for an ambient environment of the vehicle on the basis of the received image data, with no consideration of the gear information of the vehicle. Therefore, the related art AVM system 320 displays a certain top view (where a ratio is the same in front, rear, right, and left) on a monitor 330 irrespective of the driving state or driving direction of the vehicle.

For this reason, a driver further requires information suitable for a driving condition or information on an ambient condition in a driving direction depending on the driving state or driving direction of a vehicle, but the driver cannot sufficiently obtain necessary information from an image shown in a top view because displaying only the same image. Also, as in the right drawing of FIG. 1, since an image further necessary for a driver is discarded, image data obtained by a camera is not sufficiently used.

SUMMARY

Accordingly, the present disclosure provides an AVM system that checks a driving state of a vehicle on the basis of gear information and speed information of the vehicle, and displays images which are differently edited on the basis of the driving state.

The present disclosure also provides an AVM system that checks a driving direction of a vehicle on the basis of steering-angle information transferred from a steering wheel angle sensor of the vehicle, and outputs images which are differently edited depending on the driving direction.

In one general aspect, an AVM system includes: an image data receiver receiving a data signal on an image captured by at least one or more camera attached to a vehicle; a vehicle information receiver receiving gear information from a transmission of the vehicle, and receiving vehicle speed information from a vehicle speed sensor of the vehicle; and a controller generating a top-view image with the image data, determining a driving state of the vehicle on the basis of the gear information and vehicle speed information, and editing and outputting the top-view image such that different portions in the top-view image are displayed on a screen depending on the driving state, thereby providing image information suitable for a driving state to a driver.

In determining the driving state of the vehicle, when the gear information is a driving state and the vehicle speed is higher than or equal to a first reference speed, the controller may determine that the vehicle is driving forward, or when the gear information is a reverse state and the vehicle speed is higher than or equal to a second reference speed, the controller may determine that the vehicle is backing. Alternatively, when the gear information is a driving state, the controller may determine that the vehicle is driving forward, or when the gear information is a reverse state, the controller may determine that the vehicle is backing.

When the driving state is a forward state, the controller may edit and output the top-view image such that a front image of the vehicle is displayed broader than a rear image of the vehicle in the top view, or, when the driving state is a reverse state, the controller may edit and output the top-view image such that the rear image is displayed broader than the front image in the top view. The controller may edit and output the top-view image such that front and rear images of the vehicle in the top view are displayed at different ratios, according to a level of the vehicle speed. The controller may edit and output the top-view image such that front and rear images of the vehicle in the top view are displayed at different ratios, on the basis of a difference between the vehicle speed and the first reference speed or a difference between the vehicle speed and the second reference speed.

The vehicle information receiver may receive steering angle information of the vehicle from a steering wheel angle sensor of the vehicle, and may determine a driving state of the vehicle on the basis of the gear information and steering angle information or the gear information, vehicle speed information, and steering angle information.

The controller may check the driving direction on the basis of the driving state of the vehicle, and edit and output the top-view image such that an image in a direction matched with the driving direction has a high ratio in the top view.

In another general aspect, an AVM method includes: receiving image data obtained by a camera to generate a top-view image, the camera being attached to a vehicle; receiving gear information from a transmission of the vehicle, and receiving vehicle speed information from a vehicle speed sensor of the vehicle; determining a driving state of the vehicle on the basis of the gear information and vehicle speed information; and editing and outputting the top-view image such that different portions in the top-view image are displayed on a screen depending on the driving state.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
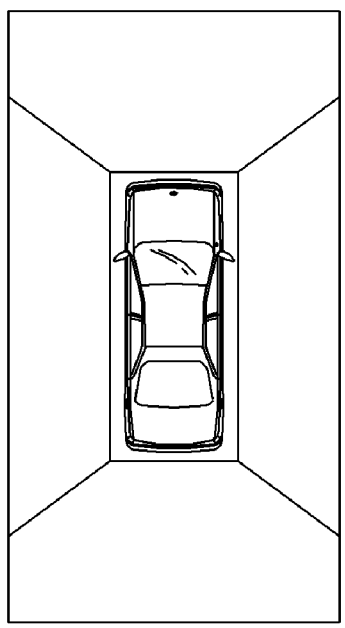
FIG. 1 is diagrams illustrating images that a related art AVM system displays on a screen.
Figure 1:
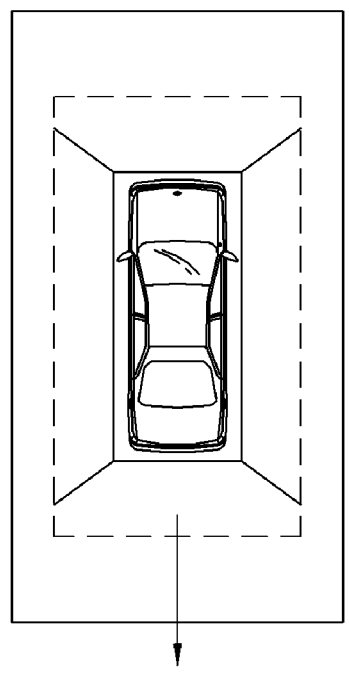
Figure 2:
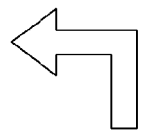
FIG. 2 is diagrams illustrating images that the related art AVM system displays on a screen depending on a driving state of a vehicle.
Figure 2:
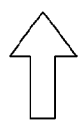
Figure 2:
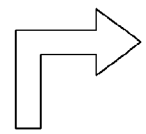
Figure 2:
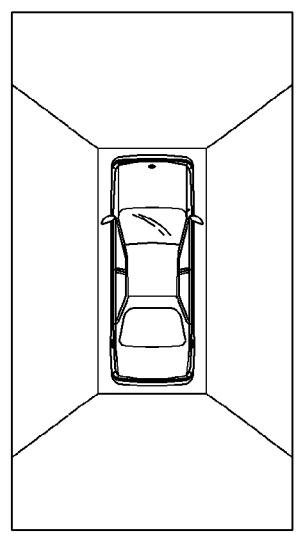
Figure 2:
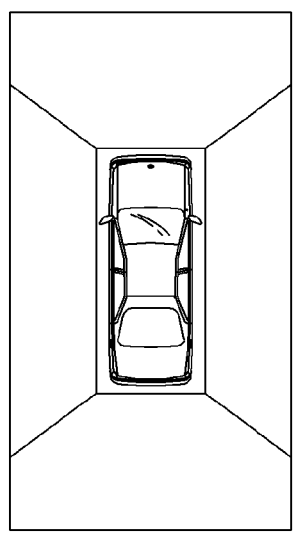
Figure 2:
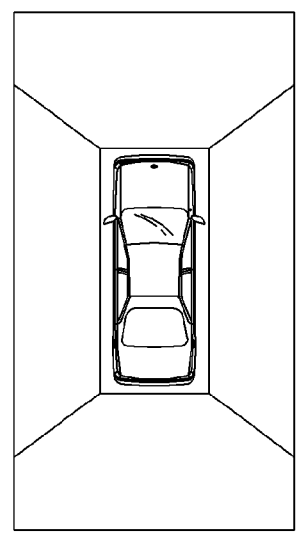
Figure 2:
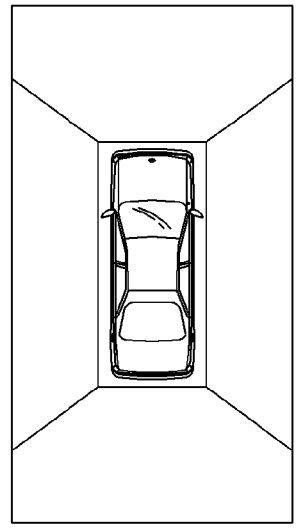
Figure 2:
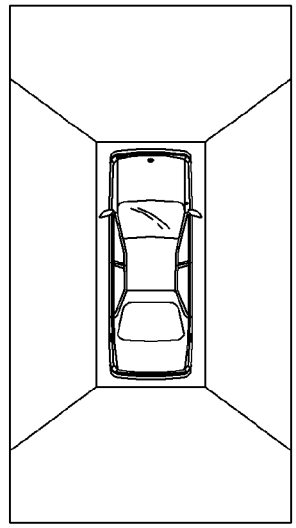
Figure 2:
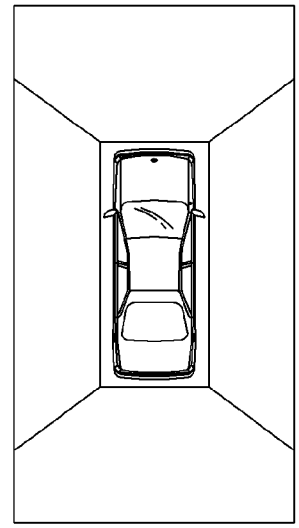
Figure 2:
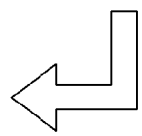
Figure 2:
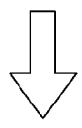
Figure 2:
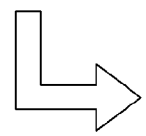
Figure 3:
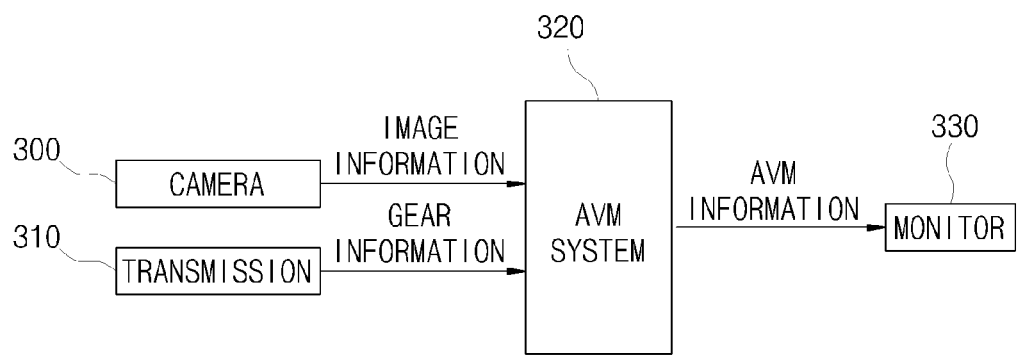
FIG. 3 is a block diagram illustrating the related art AVM system.
Figure 4:
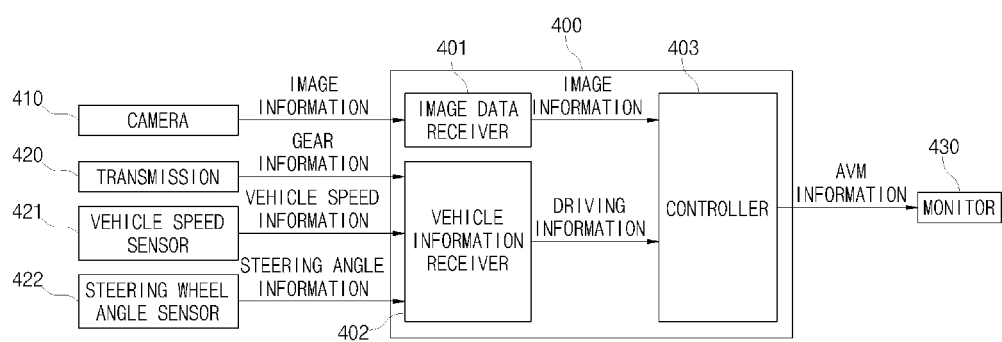
FIG. 4 is a block diagram illustrating a structure of an AVM system according to an embodiment of the present invention.

FIG. 4 is a block diagram illustrating a structure of an AVM system according to an embodiment of the present invention and a flow of information regarding the AVM system.

An AVM system 400 according to an embodiment of the present invention includes an image data receiver 401, a vehicle information receiver 402, and a controller 403.

The image data receiver 401 receives data on an image (which is captured by a camera 410 attached to a vehicle) around the vehicle. The camera 410 is provided as at least one or more. Generally, four cameras that respectively capture the front, rear, left, and right regions of a vehicle are mounted on the vehicle.

The image data receiver 401 transfers image data, received from the camera 410, to the controller 403.

The vehicle information receiver 402 receives vehicle information from sensors and elements included in the vehicle. In a related art AVM system, a vehicle information receiver receives only gear information from a transmission 420. In the AVM system according to an embodiment of the present invention, the vehicle information receiver 402 receives information on a vehicle speed from a vehicle speed sensor 421, and/or receives information on a vehicle-steering angle from a steering wheel angle sensor 422 of the vehicle.

The vehicle information receiver 402 transfers gear information, vehicle speed information, and steering angle information, which are from the sensors and elements included in the vehicle, to the controller 403.

The controller 403 generates a top-view image shown to a driver inside the vehicle, on the basis of image data received from the image data receiver 401. The top-view image is displayed by a monitor 430 inside the vehicle.

The controller 403 checks a driving state or driving direction of the vehicle on the basis of the vehicle information received from the vehicle information receiver 402.

The controller 403 determines the driving state of the vehicle on the basis of the gear information or the gear information and the vehicle information.

In determining the driving state of the vehicle, the controller 403 may check whether the gear information is driving or backing to determine the driving state of the vehicle. Alternatively, when the gear information is driving and the vehicle speed is higher than or equal to a first reference speed, the controller 403 may determine that the vehicle is driving, or when the gear information is backing and the vehicle speed is higher than or equal to a second reference speed, the controller 403 may determine that the vehicle is backing.

When the driving state of the vehicle does not correspond to forward or reverse, the controller 403 determines the vehicle as being in a stop state. Also, when the gear information is a neutral state and the vehicle speed is lower than or equal to a third reference speed, the controller 403 may determine the vehicle as being in the stop state. Here, the third reference speed has a value lower than the first reference speed.

The controller 403 may determine the driving direction of the vehicle on the further basis of the steering angle information as well as the gear information and vehicle information.

In this case, the controller 403 checks whether the vehicle is forward or reverse on the basis of the gear information or the gear information and the vehicle speed information, and checks whether the vehicle is left steering or right steering on the basis of the steering angle information. Therefore, the controller 403 divides the driving state of the vehicle into six driving states such as a forward state, a forward left turn state, a forward right turn state, a reverse state, a reverse left turn, and a reverse right turn.

The controller 403 determines the driving state or driving direction of the vehicle on the basis of the vehicle information, and differently edits top-view images displayed on a screen, on the basis of the driving conditions.

Figure 5:
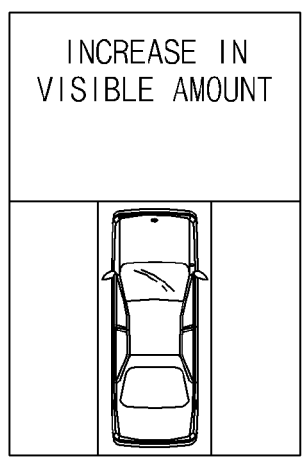
FIG. 5 is diagrams illustrating respective images that the AVM system according to an embodiment of the present invention displays on a screen depending on a driving state of a vehicle.
Figure 5:
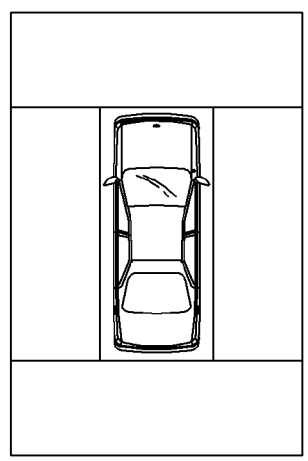
Figure 5:
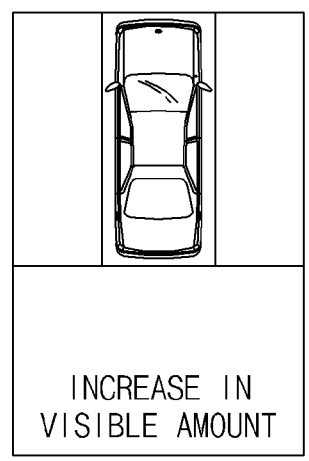

FIG. 5 illustrates top-view images that the AVM system according to an embodiment of the present invention displays differently depending on a driving state of a vehicle.

When the vehicle is in the stop state, the controller 403 outputs a top-view image (see a portion (b) of FIG. 5) in which the visible amount of a front image is the same as that of a rear image and the visible amount of a left image is the same as that of a right image. In this case, the front image may be displayed slightly broader than the rear image.

When the vehicle is driving forward, the controller 403 edits and outputs the top-view image such that the visible amount of the front image is higher than that of the rear image (see a portion (a) of FIG. 5). When the vehicle is backing, the controller 403 edits and outputs the top-view image such that the visible amount of the rear image is higher than that of the front image (see a portion (c) of FIG. 5).

Figure 6:
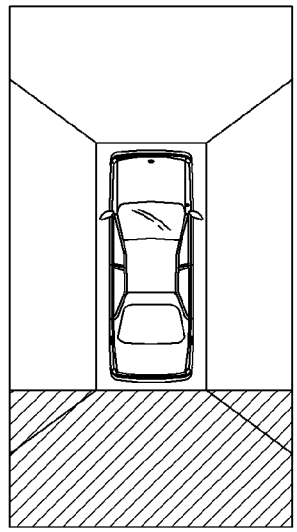
FIG. 6 is diagrams illustrating respective images that the AVM system according to an embodiment of the present invention displays on a screen depending on a driving speed of a vehicle.
Figure 6:
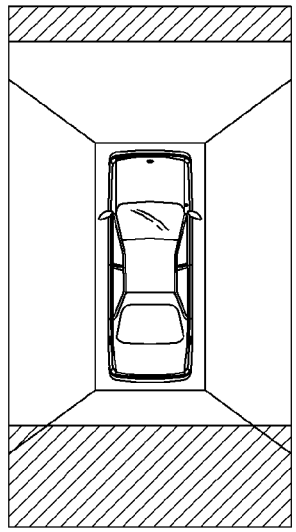
Figure 6:
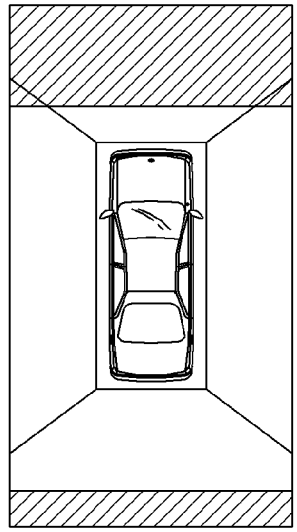
Figure 6:
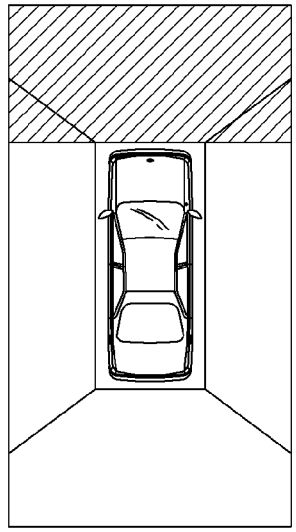

FIG. 6 illustrates top-view images that the AVM system according to an embodiment of the present invention displays differently in consideration of a driving state and driving speed of a vehicle.

The AVM system makes the visible amount of the front image and the visible amount of the rear image different depending on the vehicle speed, and thus, the controller 403 may edit and output the top-view image such that the visible amount of the front image and the visible amount of the rear image increase or decrease in proportion to the vehicle speed.

Also, the controller 403 may make the visible amount of the front image and the visible amount of the rear image different, by using the first and second reference speeds α and ζ visible amount adjustment reference values δ and ϵ that are used as reference values in determining whether the vehicle is forward or reverse.

When the vehicle is in a forward state, the controller 403 determines whether a vehicle speed is higher than or equal to "α+δ" or "α+2δ", and edits and outputs the top-view image such that the visible amount of the front image increases as the vehicle speed becomes higher (see portions (a) and (b) of FIG. 6).

When the vehicle is in a reverse state, the controller 403 determines whether a vehicle speed is higher than or equal to "ζ+ϵ" or "ζ+2ϵ", and edits and outputs the top-view image such that the visible amount of the rear image increases as the vehicle speed becomes higher (see portions (c) and (d) of FIG. 6).

Figure 7:
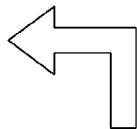
FIG. 7 is diagrams illustrating respective images that the AVM system according to an embodiment of the present invention displays on a screen depending on a driving direction of a vehicle.
Figure 7:
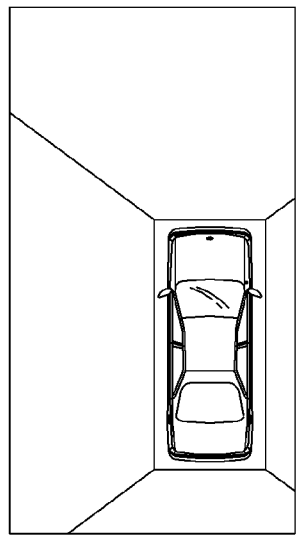
Figure 7:
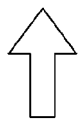
Figure 7:
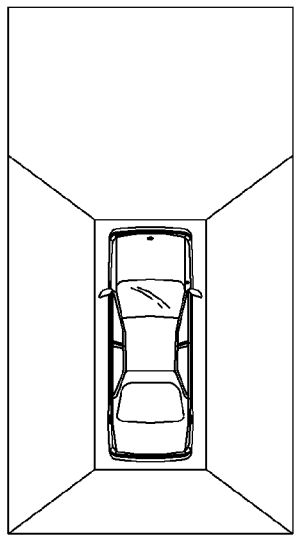
Figure 7:
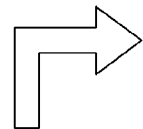
Figure 7:
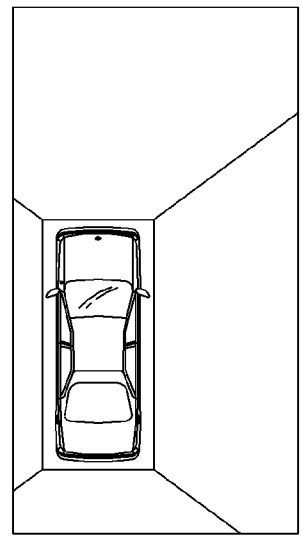
Figure 7:
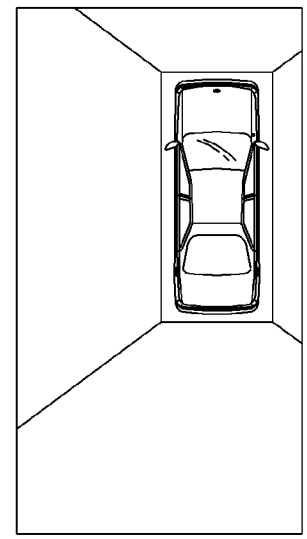
Figure 7:
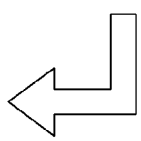
Figure 7:
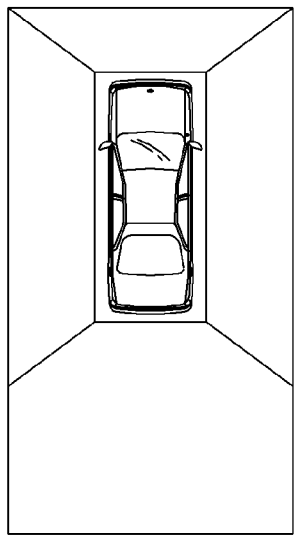
Figure 7:
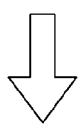
Figure 7:
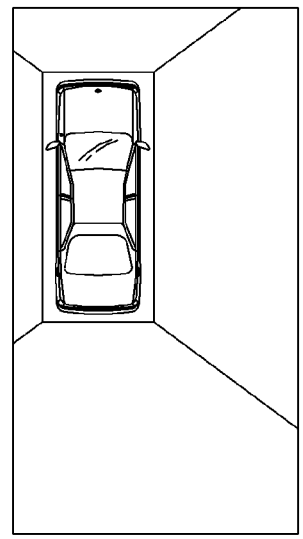
Figure 7:
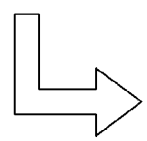

FIG. 7 illustrates a top-view image that the AVM system according to an embodiment of the present invention displays differently depending on a driving state and driving direction of a vehicle.

The controller 403 differently edits top-view images depending on six driving states of the vehicle that are obtained on the basis of the gear information and steering angle information or the gear information, vehicle speed information, and steering angle information. In this case, as illustrated in FIG. 7, the controller 403 edits and outputs the top-view images such that an image in a direction matched with the driving direction of the vehicle is relatively broader displayed on a screen.

To provide a detailed description, when the driving direction of the vehicle is forward, the controller 403 edits and outputs the top-view image such that an image (drawing in a middle upper portion) captured by a front camera is displayed broader than images respectively captured by other cameras, on a screen. When the driving direction of the vehicle is forward left turn, the controller 403 edits and outputs the top-view image such that images (drawing in a left upper portion) respectively captured by the front camera and a left camera are displayed broader than images respectively captured by other cameras, on a screen. When the driving direction of the vehicle is forward right turn, the controller 403 edits and outputs the top-view image such that images (drawing in a right upper portion) respectively captured by the front camera and a right camera are displayed broader than images respectively captured by other cameras, on a screen. When the driving direction of the vehicle is reverse, the controller 403 edits and outputs the top-view image such that an image (drawing in a middle lower portion) respectively captured by a rear camera is displayed broader than images respectively captured by other cameras, on a screen. When the driving direction of the vehicle is reverse left turn, the controller 403 edits and outputs the top-view image such that images (drawing in a left lower portion) respectively captured by the rear camera and the left camera are displayed broader than images respectively captured by other cameras, on a screen. When the driving direction of the vehicle is reverse right turn, the controller 403 edits and outputs the top-view image such that images (drawing in a right lower portion) respectively captured by the rear camera and the right camera are displayed broader than images respectively captured by other cameras, on a screen.

As described above, the controller 403 differently edits the top-view images depending on the driving state or the driving direction, and transfers the edited images to the monitor 430 inside the vehicle. A driver can obtain more ambient environment images in the driving direction of the vehicle by using the monitor 430. Accordingly, the driver can obtain more information necessary for driving, and thus, driving convenience can be provided to the driver. Also, the driver can perceive objects disposed in a relatively broader area in the driving direction, and thus can more safely drive the vehicle.

Figure 8:
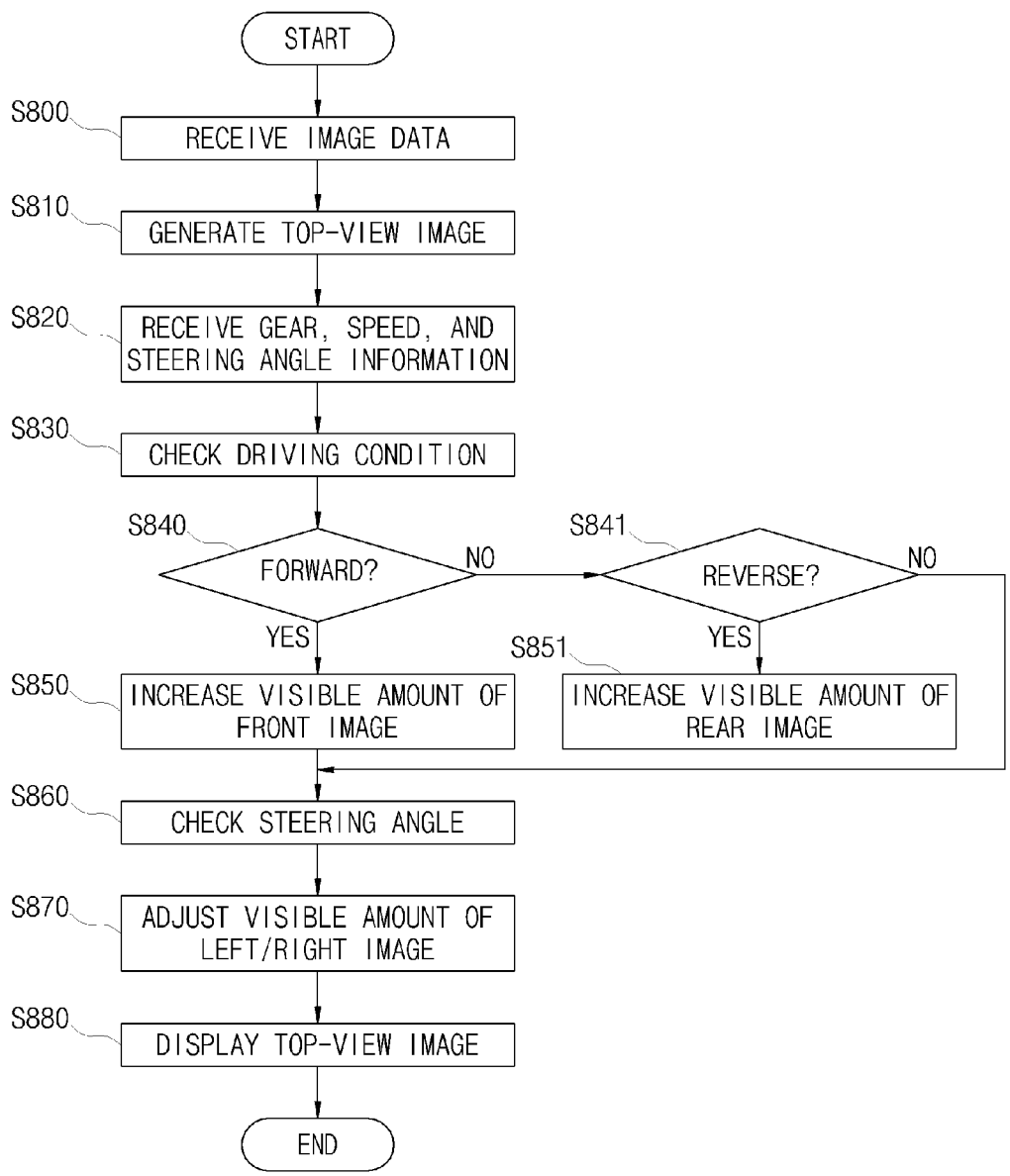
FIG. 8 is a flowchart illustrating an AVM method according to an embodiment of the present invention.

FIG. 8 illustrates a flowchart of an AVM method according to an embodiment of the present invention.

In operation S800, the AVM system receives data on images around a vehicle from front, rear, left, and right cameras attached to the vehicle. In operation S810, the AVM system generates top-view images (which are images seen downward from a portion over the vehicle on the basis of the image data) respectively showing the left, rear, left, and right conditions of vehicle.

The AVM system receives gear information of the vehicle from a transmission of the vehicle, receives a vehicle speed information from a vehicle speed sensor of the vehicle, and receives steering angle information from a steering wheel angle sensor of the vehicle, in operation S820. The AVM system checks the driving condition of the vehicle on the basis of the vehicle information in operation S830. In this case, the AVM system determines whether the vehicle is a forward state, a rear state, or a stop state according to whether the gear information is driving or backing and whether the vehicle speed is higher than or lower than a reference speed.

When it is determined that the driving state of the vehicle is driving forward in operation S840, the AVM system increases the visible amount of a front image among the top-view images, in operation S850. When it is determined that the driving state of the vehicle is backing in operation S841, the AVM system increases the visible amount of a rear image among the top-view images, in operation S851. When it is determined that the driving state of the vehicle is not forward or reverse, the AVM system identically maintains the visible amounts of the front image and rear images among the top-view images.

The AVM system checks the left/right moving direction of the vehicle on the basis of the steering angle information from the steering wheel angle sensor in operation S860, and, by adjusting the visible amounts of the left image and the right image among the top-view images, the AVM system increases the visible amount of an image in a direction matched with the moving direction of the vehicle, in operation S870.

In operation S880, the AVM system displays the top-view images, which are differently edited depending on the driving condition, on a monitor inside the vehicle. Accordingly, the AVM system provides image information, which is necessary for driving, to a driver.

As described above, in editing an image captured by a camera attached to a vehicle to provide a top-view image, the present invention checks a driving state and driving direction of the vehicle on the basis of information received from sensors and elements included in the vehicle, and displays top-view images which is differently edited depending on the driving conditions, thus providing driving convenience to a driver and reducing the risk of an accident.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An around view monitor (AVM) system, comprising:
   an image data receiver configured to receive image data captured by a camera;
   a vehicle information receiver configured to receive a speed of a vehicle, and steering angle information of the vehicle; and
   a controller configured to
      generate a top-down view image based on the image data, the top-down view image comprising an area surrounding the vehicle,
      determine a travel direction of the vehicle based on the vehicle speed and the steering angle information,
      modify the top-down view image such that a visible portion of the area surrounding the vehicle corresponding to the travel direction is increased in proportion to increased vehicle speed, and decreased in proportion to decreased vehicle speed, and
      display the modified top-down view image on a display,
   wherein the controller is further configured to:
      make a visible amount of a front portion of the top-down view image and a visible amount of the rear image different, by using a first reference speed $\alpha$, a second reference speed $\zeta$, and visible amount adjustment reference values $\delta$ and $\epsilon$, and
   wherein the controller is further configured to:
      determine whether the vehicle speed is higher than or equal to a speed $\alpha+\delta$;
      determine whether the vehicle speed is higher than or equal to a speed $\alpha+2\delta$; and
      modify the top-down view image such that a visible amount of the front portion of the top-down view image increases in proportion to the speed $\alpha+\delta$ and further increases in proportion to the speed $\alpha+2\delta$, as the vehicle speed becomes higher.

2. The around view monitor (AVM) system of claim 1, wherein the controller is further configured to:
   determine whether the vehicle speed is higher than or equal to a speed $\zeta+\epsilon$;
   determine whether the vehicle speed is higher than or equal to a speed $\zeta+2\epsilon$; and
   modify the top-down view image such that a visible amount of the rear portion of the top-down view image increases in proportion to the speed $\alpha+\delta$ and further increases in proportion to the speed $\alpha+2\delta$, as the vehicle speed becomes higher.

* * * * *